(12) United States Patent
Olway

(10) Patent No.: US 7,515,331 B2
(45) Date of Patent: Apr. 7, 2009

(54) TWIN OPTICAL AMPLIFIER WITH DUAL PUMP POWER CONTROL

(75) Inventor: Alan Olway, Cambridgeshire (GB)

(73) Assignee: Xtera Communications Ltd., Romford (GB)

(*) Notice: Subject to any disclaimer, the term of this patent is extended or adjusted under 35 U.S.C. 154(b) by 41 days.

(21) Appl. No.: 11/459,539

(22) Filed: Jul. 24, 2006

(65) Prior Publication Data
US 2007/0019284 A1 Jan. 25, 2007

Related U.S. Application Data

(60) Provisional application No. 60/702,235, filed on Jul. 25, 2005.

(51) Int. Cl.
H04B 10/12 (2006.01)

(52) U.S. Cl. .......... 359/341.3; 359/341.33; 359/341.4

(58) Field of Classification Search ......... 359/341.3, 359/341.33
See application file for complete search history.

(56) References Cited

U.S. PATENT DOCUMENTS

| | | | | |
|---|---|---|---|---|
| 5,995,275 A | * | 11/1999 | Sugaya | 359/341.3 |
| 6,215,583 B1 | * | 4/2001 | Lagerstrom et al. | 359/341 |
| 6,456,426 B1 | * | 9/2002 | Bolshtyansky et al. | 359/334 |
| 2002/0105703 A1 | * | 8/2002 | Grubb et al. | 359/173 |
| 2002/0186458 A1 | * | 12/2002 | Gao et al. | 359/341.4 |
| 2002/0186952 A1 | | 12/2002 | Gao et al. | |
| 2003/0174390 A1 | | 9/2003 | Kakui | |
| 2003/0206335 A1 | | 11/2003 | Pan et al. | |

FOREIGN PATENT DOCUMENTS

| | | |
|---|---|---|
| EP | 0 525 684 | 2/1993 |
| EP | 0 595 395 | 5/1994 |

OTHER PUBLICATIONS

EPO Search Report Dated Jun. 6, 2006.

* cited by examiner

*Primary Examiner*—Minsun Harvey
*Assistant Examiner*—Xnning Niu

(57) ABSTRACT

An apparatus for amplifying optical communications systems is provided in which one or more amplifier modules, each containing an optical amplifier and at least two pump lasers, are optically isolated from a plurality of control modules. Each control module controls a single pump laser in one or more of the amplifier modules. A control module can thus be removed without disabling any amplifier module, while the plurality of pump lasers in each amplifier module allow for effective operation even if one of the pump lasers should fail. The pump lasers in each module are controlled by a master-slave relationship, whereby the master pump laser is adjusted to optimise overall output, while the slave laser(s) are adjusted to equalize the power output of the lasers.

13 Claims, 2 Drawing Sheets

TWIN OPTICAL AMPLIFIER WITH DUAL PUMP POWER CONTROL

CROSS REFERENCE TO RELATED APPLICATIONS

This application claims the benefit of U.S. Provisional Patent Application Ser. No. 60/702,235, filed on Jul. 25, 2005.

BACKGROUND OF THE INVENTION

The present invention relates to the amplification of optical signals in long-haul optical communications systems.

In optical transmission systems, both incoming and outgoing signals are amplified at the line terminal equipment (LTE) to ensure adequate signal strength. Optical amplifiers, such as erbium-doped fibre amplifiers (EDFAs), are now in widespread use to achieve this aim. When the optical signal passes through an EDFA a pump is applied at a wavelength which causes excitement of the erbium atoms in such a way that there is consequent amplification of the optical signal. Suitable lasers for the task are widely available, and are conventionally provided with integrated control electronics.

Traditionally, when designing high-reliability optical amplifiers for use in submarine LTEs, the pump lasers and their associated electronics are duplicated to provide redundancy should one fail. They are also replaceable. Since they are integrated, failure of either a pump or of its control electronics requires replacement of both. As the pump laser must clearly be optically connected to the EDFA, this requires optical fibres to be disconnected creating a potential safety hazard.

BRIEF SUMMARY OF THE INVENTION

According to the first aspect of the present invention, there is provided an apparatus for amplifying optical communication signals, comprising:

one or more amplifier modules, each amplifier module comprising an optical amplifier and at least two pump lasers; and, at least two separate control modules, each control module adapted to control the output of one pump laser in one or more amplifier modules.

As separate control modules control the pump lasers in a single amplifier module, the present invention advantageously allows control modules to be removed (for example, for replacement or upgrade) without disabling the apparatus. In fact, each pump laser is preferably capable of driving its optical amplifier alone, so that the removal of a control module has no significant effect on the output of the apparatus. Moreover, the control modules are preferably optically isolated from the amplifier modules, such that removal of a control module presents no laser safety issues.

The pump lasers in each amplifier module preferably operate at the same wavelength. Moreover, in a preferred embodiment, the output of each pump laser is shared between co- (with the direction of the optical communications signal) and counter- (against the direction of the optical communications signal) pumping modes in the optical amplifier of the amplifier module containing that pump laser. As such, if one or more of the pump lasers in an optical amplifier module ceases functioning there is no effect on the ratio of co- and counter-pumping modes in the associated amplifier module.

In a preferred embodiment, the present invention comprises two amplifier modules and each amplifier module comprises two pump lasers. Preferably, this embodiment also comprises two control modules.

The preferred embodiment of the present invention enables the control of two independent optical amplifiers (EDFAs), each with dual pump lasers for redundancy, using a pair of replaceable, hot-swappable electronic control modules. Each control module manages one pump laser from each amplifier; a single control module is thus able to control both amplifiers. Preferably, the pump lasers are over-rated (i.e. they are capable of producing a more powerful output than is required) so that the design life of the amplifier can be met with just one pump laser working. In accordance with the present invention, the control modules may be hot-swappable for easy replacement. The control modules are optically isolated from the amplifier module, and consequently there are no laser safety issues during control module replacement. Moreover, optical connections are easily damaged (they are particularly sensitive to dirt) and so the removal of an optical connection between the control modules and the amplifier in itself provides an enhancement to the reliability of the system.

One or more of the control modules may be adapted to measure the effective gain of the amplifier module. This allows the control modules to automatically ensure that the gain of the amplifier is as desired by the user.

The control modules are preferably linked so as to allow status indicators to be passed between them. Coordinated control of the control modules (in order, for example, to balance the wear on the pump lasers) is thus possible.

In a preferred embodiment, each control module is adapted to control a plurality of pump lasers (each in a different amplifier module). Though the logical control of each pump laser is separate the same control circuitry may be used for a plurality of pump lasers, thus optimising the use of the available electronics.

By combining the dual pump lasers with each EDFA in a single twin amplifier optical assembly and having separate hot-swappable electronic control modules the following improvements are available:

(1) The optical fibres are not touched during control module replacement. Hence there are no laser safety issues.

(2) Over-rating the pump lasers ensures that failure of one pump laser does not compromise the design life of the amplifier.

(3) It is very easy to replace or upgrade the control modules.

(4) The control modules can be made very small and simple so reducing heat dissipation and power consumption and improving reliability.

(5) Two amplifiers can be controlled by two control modules rather than four sets of control electronics contained in integrated laser modules.

(6) A 'black box' amplifier module may be used, thus simplifying both procurement and development.

(7) The amplifiers continue functioning during the replacement or upgrade of associated control modules.

According to a second aspect of the present invention, there is provided a method of adjusting the gain of an optical amplifier using a plurality of pump lasers controlled by a plurality of respective control modules, comprising the steps of:

electing which of the control modules is a master control module;

adjusting an operational parameter of the pump laser associated with the master control module towards the point at which the gain of the optical amplifier is equal to a predetermined ideal value; and, adjusting the operational parameter of each of the remaining pump lasers towards the point at which the operational parameters of all the pump lasers are equal.

Preferably, the operational parameter is an applied input current. However, it is also envisaged that the operational parameter may be the output of the pump lasers.

Preferably the step of adjusting the output of each of the remaining pump lasers comprises adjusting the operational parameter of each of the remaining pump lasers towards the operational parameter of the pump laser associated with the master control module.

The second aspect of the present invention ensures that wear is substantially equal on both pump lasers, while concurrently ensuring that the output of the optical amplifier is as desired by the user. As a consequence, the lifetime of each pump laser is maximised. In turn, this allows integrated amplifier modules, comprising an optical amplifier and plurality of pump lasers, to be produced with a life expectancy at least substantially equal to the optical amplifier component itself.

According to a third aspect of the present invention, there is provided a computer program product comprising computer executable code for implementing the method of the second aspect.

BRIEF DESCRIPTION OF THE DRAWINGS

Examples of the present invention will now be described in detail with reference to the accompanying drawings, in which.

DETAILED DESCRIPTION

Figure 1:
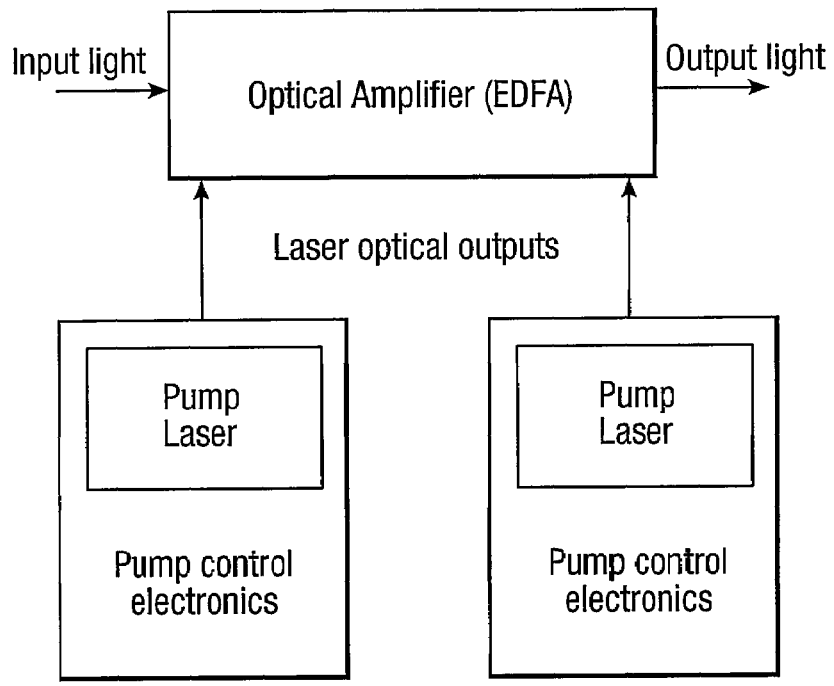
FIG. 1 is a schematic view of the configuration of a typical prior art optical amplifier.

FIG. 1 shows a schematic view of the conventional structure of an optical amplifier used in submarine optical communications. As can be seen, two pump lasers are provided for redundancy. Each pump laser and its associated control electronics are integrated as distinct modules which are connected to the optical amplifier by optical fibre connections. Replacement of a laser or its control electronics consequently involves replacement of both and is made arduous not only by the laser safety issues involved in disturbing the optical connection but also by the extreme susceptibility of laser-carrying optical fibres to dirt. Were dust to enter the fibre during the replacement process the performance of the replacement module would be severely compromised. As a result of the care needed, the replacement of lasers or their control electronics in conventional systems can be time consuming and consequently expensive.

In recent times, significant improvements have been made to the reliability of the pump lasers. Moreover, the life of pump lasers is increased when they are operated below their maximum power, further increasing their reliability in a system that typically provides two pumps for each amplifier. Consequently, if suitably rated pump lasers are used, it is now possible to produce pump laser pairs that satisfy the design life requirements typically set for submarine optical amplifiers.

Nevertheless, the control electronics are less reliable than typical amplifier requirements. Since in conventional systems the lasers and control electronics are typically integrated, pump lasers are often replaced during the amplifier lifetime unnecessarily.

The present invention overcomes this problem by separating the pump laser and its control electronics, allowing the electronics to be replaced separately. Moreover, because of their improved reliability, the pump lasers may be integrated with the EDFA into an integrated amplifier module. Such a module contains all the required optical pathways, negating the need for external optical connections. Consequently, the control electronics may be replaced without any laser safety issues.

Figure 2:
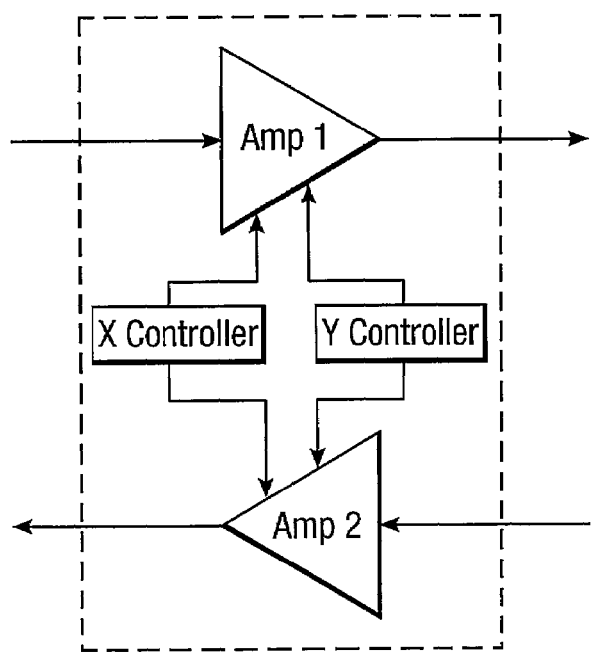
FIG. 2 is a schematic view of a dual amplifier circuit pack in accordance with one embodiment of the present invention.
Figure 3:
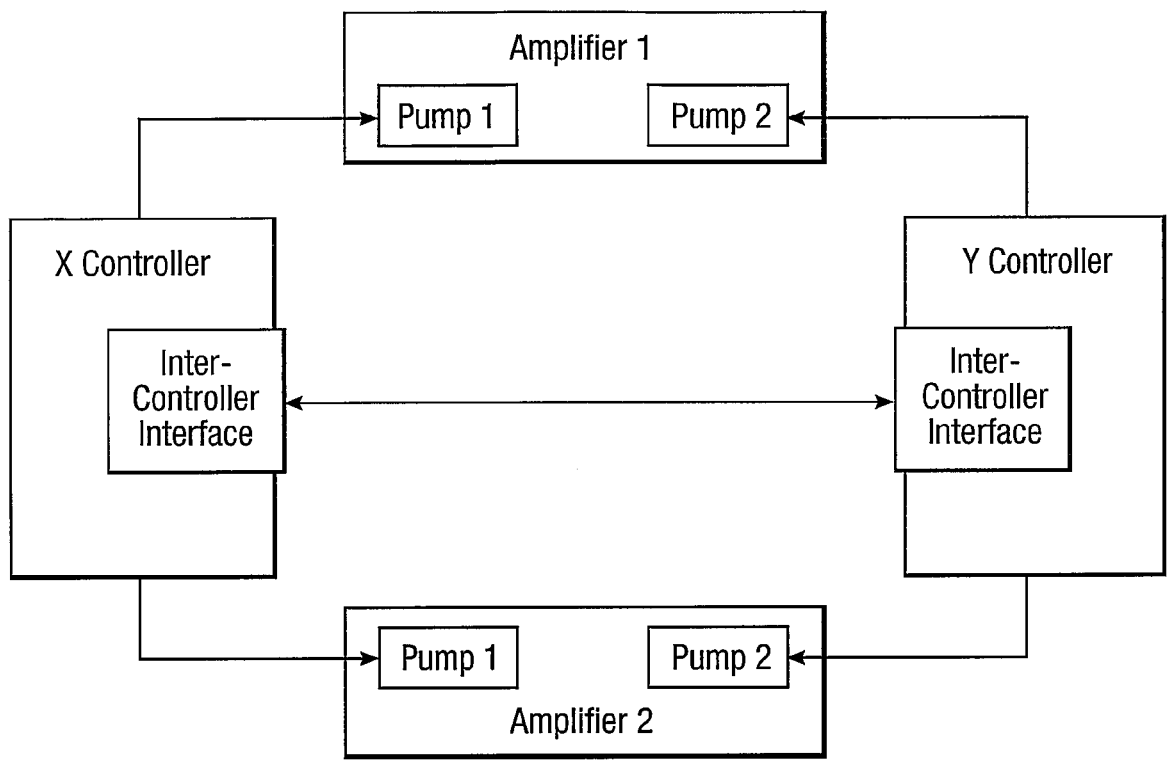
FIG. 3 is a schematic view of the interface between pump lasers and control modules in accordance with one embodiment of the present invention; and, FIG. 4 is a view of the mechanical arrangement of a dual amplifier circuit pack in accordance with one embodiment of the present invention.
Figure 4:
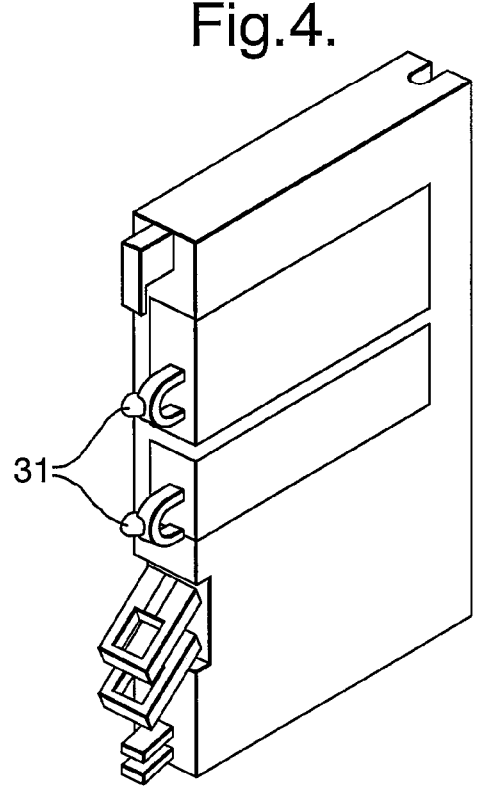

FIGS. 2 to 4 show a preferred embodiment of the present invention. In this embodiment two amplifier modules and two control modules are integrated on a single circuit pack. Each amplifier module contains an EDFA and two pump lasers, with each pump laser in a single amplifier module being controlled by a separate control module. The control modules, therefore, control a single pump laser in each amplifier module. Though the pump lasers are rated such that they may drive an EDFA alone, the provision of two lasers increases their lifetime and allows for redundancy. Nevertheless, it must be understood that the removal or failure of a single control module does not disable either amplifier module.

The present invention therefore provides a system for replacing amplifier control circuitry that not only leaves all optical pathways unaffected but also leaves amplifier performance undiminished.

It is to be understood that the embodiment described by the figures is not the only envisaged implementation of the present invention. There may, for example, be more than two pump lasers in each amplifier module, or any number of amplifier modules on a single circuit pack. Moreover, though the control modules of the preferred embodiment utilise shared electronics to control a plurality of pump lasers, it should be understood that the control circuitry for each pump laser may be entirely independent. In all cases, however, the logical control of each pump laser is separate. Indeed, it would be possible to employ separate control modules for each pump laser if so desired. The only requirement in this regard is that each pump laser on a given amplifier module must be controlled by separately replaceable control circuitry.

The control modules have a simple electrical interface to the amplifier modules. This makes it very easy to provide simple microprocessor-based control modules that are compact and simple. The simplicity increases reliability and reduces heat dissipation.

Each control module receives amplifier input and output power measurements and pump power measurements from the amplifier modules. Each control module can adjust the power of each pump (by altering its bias current) to control the overall amplifier output power or gain. The control modules co-operate to ensure the two pumps for each amplifier share the input current or the power equally.

FIG. 3 shows the interfaces between the control modules and with the amplifiers and their pumps. Each control module may have access to certain attributes of the pumps managed by the other control module so it can balance the pumps. Alternatively, the control modules may balance the pumps by passing the relevant pump attributes between each other.

FIG. 4 shows the mechanical arrangement of an embodiment of the present invention. Since the control modules hold only electronic components, this arrangement is simple (there being only electrical interfaces between the amplifier modules and the control modules). The control modules 31 are able to slide out from the front of the Circuit Pack allowing replacement to take just a few seconds. All optical connections are on the main part of the Circuit Pack so are not affected by control module replacement.

The control modules operate the pump lasers in each amplifier module in a master/slave arrangement; the master maintains the overall amplifier gain/power (by controlling pump power) whilst the slave balances the pumps (using either their bias currents or output power) to equalise the pump laser ageing.

In order to facilitate the coordination of the control modules a number of status indicators may be passed between the control modules. Envisaged indications that may be passed between the control modules include:

A presence indicator (indicating whether or not the controller is plugged in). This is not essential but helps to indicate why a controller may not be available.

An activity indicator (indicating that the controller is operating properly).

Regular and frequent status messages indicating whether the controller is acting as the master or the slave controller for the amplifier.

Regular and frequent status messages indicating whether or not the amplifier pump is in automatic control. As an emergency measure, the control modules may adopt manual control (rather than the usual automatic) when a severe failure occurs, for instance in the electronics or lasers of the present invention. Moreover, should the lasers be shut down for any reason (for example laser safety reasons if an optical fibre were to break) the control modules may take the pump lasers out of automatic control.

Each control module deems the other to be operational under the following circumstances: the other controller is present; the other controller is operating (its active indicator is on); and the other controller is sending regular status messages.

The status indicators are passed between the control modules at a high rate in order to allow a rapid response. The fastest possible reaction time will clearly be the repetition rate of the amplifier control loop controlling the signal applied to the pump lasers.

Which pump laser acts as master is decided by election between the control modules. If ever there is any doubt, all pump lasers operate as masters until the election completes to ensure that the amplifier gain/power is maintained even if the pumps are not balanced. Eventually one becomes the slave. The master/slave election operates independently for each amplifier.

The election may be controlled by a simple algorithm that recognises whether a master already exists, and, if it detects one, adopts the role of slave. If initially both control modules adopt the role of master, one module may be biased to back down and become the slave while the other is biased to remain as the master. If the controllers are labelled X and Y, and the Y controller is biased to back down, an example algorithm followed by each controller may be expressed as follows:

IF the other control module is not operational THEN this control module is the master ELSE IF this control module is in automatic control mode AND the other control module is not in automatic control mode THEN this control module is the master ELSE IF this control module is not in automatic control mode AND the other control module is in automatic control mode THEN this control module is the slave
　　ELSE IF BOTH control modules claim to be the master THEN
　　　　IF this condition has lasted for a predetermined period of time AND this is the Y control module THEN this control module is the slave
　　　　ELSE This control module remains the master
　　　　END IF
　　ELSE IF the other control module is the slave THEN this control module is the master
　　　　ELSE this control module is the slave.
　　END IF It is clear from the above that if the links between the controllers fail then both controllers will opt to be masters. This will ensure that the gain of the amplifier remains steady and as desired though it will not ensure the balancing of the pump lasers.

In one embodiment, the master control module uses the common PID (Proportional, Integral, Derivative) control loop algorithm. The amplifier output power is the controlled variable whilst the pump bias current is the control variable. If the amplifier is in constant gain mode then the desired output power is calculated from the amplifier input power and desired gain.

The slave makes small adjustments to its pump control to balance the wear on the pump lasers. As referred to above, the adjustments may be made in dependence on the output levels of the pump lasers or on the level of the bias currents driving them. Preferably, the applied bias current level is adopted since it negates the need for electronic pump output measurement devices within the integrated pump amplifier module. Moreover, it is typically easier to obtain reliable and accurate measurements of currents than laser outputs.

Each adjustment moves the slave pump level towards the master pump level, with the ultimate aim of equalising the two levels. A further advantage of using bias currents rather than output powers as the relevant levels arises from the possibility of differences in the ageing rate of each laser. In such a scenario, equalising the power output of the lasers would have the effect of driving a more worn laser at a higher current than the other, thus increasing the likelihood of further differentiation in the ageing rates of the two lasers.

The slave adjustments cause a small error in the amplifier output gain which is subsequently detected and corrected by the master power control loop. The magnitude of each adjustment is set to be very small so that the impact on the amplifier power/gain is negligible.

If a pump fails or a control module fails or is removed, the remaining working controller/pump combination takes over full control of the amplifier (becoming the master if it was not previously) and increases the pump power to compensate for the loss of the other pump. When a replacement control module is inserted, it will assume the slave role and adjust the pumps until the two pumps for each amplifier are balanced again.

In one embodiment of the present invention, the slave may have some control over the output power as well as the balance between the pump lasers. This may improve reaction times when the master fails, since the slave need not directly detect this before ensuring an adequate amplifier output. However, if the slave is too sensitive to the overall input any difference between the amplifier output measured by the master and the slave is found to force continual imbalances between the pumps. It is therefore preferable that, if the slave is to control output power at all, it does so with a large deadband. When the error between desired and actual power is within the deadband, the slave then balances the pumps.

Though the master/slave relationship is described above in terms of a two pump per amplifier system it is important to recall that the possibility of further lasers in each amplifier has been considered. According to the present invention, when three or more pump lasers are present only one will be controlled as the master, while the remaining lasers will be slaves (every slave aiming to balance with the master).

In an embodiment comprising three or more control modules, the status indications of each control module will be passed to all of the other control modules. This may be done over multi-drop links (i.e. a single transmission link from one module will be received by the remaining modules) or across any available communications bus. Any links are preferably duplicated for redundancy.

To illustrate the operation of more than two control modules, consider a system operating with three control modules, one of which is the master. If the two slave outputs are either side of the master output they will be adjusted towards the master output, and assuming they are adjusted at a similar rate the master output will not alter. Conversely, if the output of the master is equal to one of the slave outputs then the other slave will adjust itself towards the master output, causing the master output to fall (conserving the total output) and the previous situation to be re-entered. Finally, if both slave outputs lie to one side of the master output they will clearly both adjust towards the master and the master will consequently adjust towards them.

The invention claimed is:

1. An apparatus for amplifying optical communication signals, comprising:
    at least two amplifier modules, each amplifier module comprising an optical amplifier and a plurality of plump lasers for each amplifier; and,
    a plurality of control modules separate from the amplifier modules, each control module adapted to control the output of a respective one of the pump lasers in each of the amplifier modules.

2. The apparatus according to claim 1, wherein the output of each pump laser is shared between co- and counter-pumping modes in the optical amplifier of the amplifier module containing that pump laser.

3. The apparatus according to claim 1, wherein the control modules are optically isolated from the amplifier modules.

4. The apparatus according to claim 1, wherein one or more of the control modules is adapted to measure the effective gain of one or more of the amplifier modules.

5. The apparatus according to claim 1, wherein the control modules are linked, thereby allowing status indicators to be passed between them.

6. The apparatus according to claim 1, wherein each control module is adapted to control a plurality of pump lasers.

7. The apparatus according to claim 1, wherein the optical amplifiers are erbium-doped fibre amplifiers (EDFAs).

8. The apparatus according to claim 1, wherein each control module is individually removable from the apparatus.

9. A method of adjusting the gain of an optical amplifier using a plurality of pump lasers for each optical amplifier, each pump laser control by a respective control module, each control module adapted to control the output of a respective one of the pump laser in each of a plurality of amplifier modules, comprising the steps of:
    electing which of the control modules is master control module;
    adjusting an operational parameter of the pump lasers associated with the master control module towards the point at which the gain of the optical amplifier is equal to a predetermined ideal value; and,
    adjusting the operational parameter of each of the remaining pump lasers towards the point at which the operational parameters of all the pump lasers are equal.

10. The method according to claim 9, wherein the operational parameter is an input current applied to the pump lasers.

11. The method according to claim 10, wherein the operational parameter is an output of the pump lasers.

12. The method according to claim 9, wherein the step of adjusting the output of each of the remaining pump lasers comprises adjusting the operational parameter of each of the remaining pump lasers towards the operational parameter of the pump laser associated with the master control module.

13. A computer program product comprising computer executable code recorded on a computer readable medium for performing the method of claim 9 for adjusting the gain of an optical amplifier using a plurality of pump lasers controlled by a plurality of respective control modules.

* * * * *

UNITED STATES PATENT AND TRADEMARK OFFICE
CERTIFICATE OF CORRECTION

| | | |
|---|---|---|
| PATENT NO. | : 7,515,331 B2 | Page 1 of 1 |
| APPLICATION NO. | : 11/459539 | |
| DATED | : April 7, 2009 | |
| INVENTOR(S) | : Alan Olway | |

It is certified that error appears in the above-identified patent and that said Letters Patent is hereby corrected as shown below:

Claim 9, Col. 8, line 17, after "laser", change "control" to -- controlled --.

Claim 9, Col. 8, line 19, after "pump", change "laser" to -- lasers --.

Signed and Sealed this

Twenty-second Day of September, 2009

David J. Kappos
*Director of the United States Patent and Trademark Office*